July 21, 1942.   G. E. HOLMAN ET AL   2,290,186
LUMINESCENT COATING FOR ELECTRIC LAMPS
Filed Sept. 6, 1940
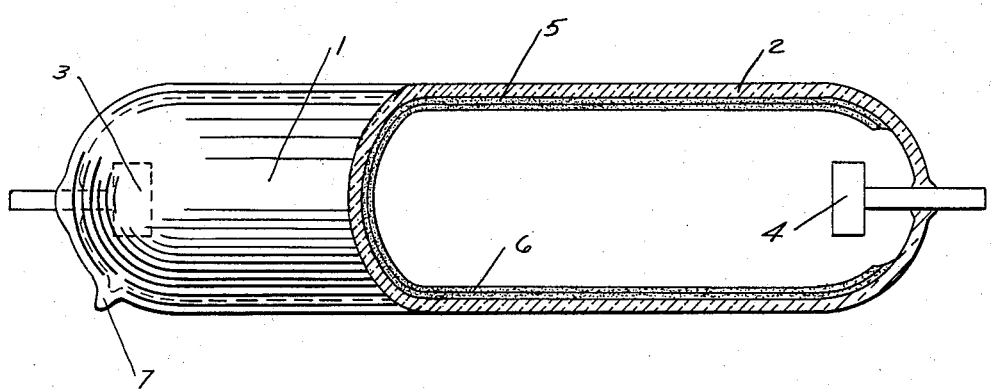
GEORGE HOLMAN
EZIO THOMAS CASELLINI
INVENTORS.
BY Lawrence Burns,
ATTORNEY.

Patented July 21, 1942

2,290,186

UNITED STATES PATENT OFFICE 2,290,186

LUMINESCENT COATING FOR ELECTRIC LAMPS

George E. Holman, Melrose, and Ezio Thomas Casellini, Salem, Mass., assignors to Hygrade Sylvania Corporation, a corporation of Massachusetts Application September 6, 1940, Serial No. 355,618

6 Claims. (Cl. 176—122)

The present invention relates to electric lamps and to fabricated glass articles generally, and in particular to luminescent bulbs or tubes for electric lamps and to methods of manufacture thereof.

An object of the present invention is to provide for such lamps and the like a firmly-adherent, easily-applied coating which is uniformly and brightly luminescent, and which is free from lines and mottling. A further object is to provide a coating which will lower and stabilize the starting voltage of the lamp, and yet another object is to provide a light-modifying layer or filter between the fluorescent coating and the glass tube or bulb.

A feature of the invention is a luminescent coating free from lines and mottling. A further feature is a coating containing a small amount of carbon to reduce the starting voltage; a still further feature is a filter layer comprising barium sulphate and a cadmium salt interposed between the fluorescent layer and the glass of the bulb or tube. And yet another feature is a luminescent coating of extremely small particle size.

Other objects and advantages of the invention will be apparent from the following description, taken in connection with the accompanying drawing, in which:

The single figure of the drawing is a profile view, partly in section, of a lamp according to the invention.

In that figure, the lamp envelope 1, which may be a glass tube 2, has the electrodes 3, 4 sealed through it at each end, a coating 5 of the light-modifying or filtering materials on its inner surface, and a coating 6 of luminescent material over the filtering layer 5. The envelope is sealed by the exhaust tubulation 7, and contains an inert or rare gas such as argon or neon for example, at low pressure, and generally a small quantity of mercury vapor. An electrical discharge may be produced between the electrodes 3 and 4, giving off ultraviolet light, cathode rays, ions, atoms or the like which will fall on the luminescent coating 6, causing it to give off light by fluorescence, phosphorescence or the like, which may be conveniently grouped under the generic term "luminescence."

The coating 6, when excited by the discharge, emits light of a color which depends on the material used. Cadmium borate will emit reddish light, zinc silicate a green light, and magnesium tungstate will give a blue light. Other colors may be obtained by using other materials, or by using mixtures of materials. Certain colors, however, such as gold or yellow, and deep red are not commercially obtainable by any known light-emitting materials or combination of such materials. In such cases, we use luminescent material, which although not of the desired color, contains the wavelengths corresponding to the desired color and other wavelengths in addition, and then interpose the filter layer 5 between the luminescent layer and the glass, the filter layer 5 being designed to transmit the wavelengths corresponding to the desired color, but to absorb wavelengths of a different color.

For example, we might use as a luminescent material a mixture of yellowish-fluorescing zinc manganese beryllium silicate with greenish-fluorescing zinc manganese silicate the mixture emitting a greenish-yellow color, and then use a filter layer of cadmium sulphide to absorb the greener wavelengths, allowing only the yellow to pass. Of itself, however, cadmium sulphide has the disadvantage that if used in a reasonably thick layer, it absorbs too much light, and if used in a form which transmits enough light, it does not completely cover the glass, so that some of the luminescent material is also present on the glass, giving a non-uniform coating and color.

We find that by mixing considerable barium sulphate with the cadmium sulphide, the above difficulty is obviated. The barium sulphate is white, and acts to dilute the color of the cadmium sulphide, so that a thickness of the filter layer sufficient to entirely cover the glass can be used. If the yellow form of cadmium sulphide is used in the yellow filter layer, it may change color markedly on heating. About 50% by weight of the cadmium sulphide may be used in the filter, the remaining 50%, being barium sulphate.

The luminescent layer is placed over the filter layer. As pointed out later in the present specification, both these layers may be porous. Some of the exciting radiations from the discharge may thus penetrate the luminescent layer, but the barium sulphate being a good reflector for ultraviolet light and the like will reflect them back onto the luminescent layer, where they will produce visible light. Moreover, some of the luminescent particles may penetrate into the filter layer, and the barium sulphate, being a non-absorber of ultraviolet light, will transmit enough of the rays it does not reflect, to excite those particles.

The grain size of the particles in the filter layer should be as small as possible, for better mixing and also to prevent much penetration of the filter layer by the luminescent particles, which may be slightly larger. For example, if the luminescent particles are 2 to 7 microns in size, filter particles may be 0.1 to 1 micron in size.

A greenish-yellow fluorescent material, such as zinc manganese beryllium silicate in which the proportions of zinc manganese and beryllium are adjusted to give that color fluorescence, may be used as the emitting material for the luminescent layer. The silicate may if desired, be a meta-, as distinguished from an ortho-, silicate. A small amount, about 3% by weight, of zinc manganese silicate should be mixed with the zinc manganese beryllium silicate. The filter layer and the luminescent layer are both applied to the glass in the same manner but the filter layer shoud be applied first. The materials for either layers are mixed to the proper proportions, and then suspended in a binding mixture.

The binding medium may be amyl acetate. If the particles are mixed directly into it or some similar medium, and then applied, the final coating will have a somewhat mottled appearance, consisting of separated agglomerates of particles, and not of a coating of uniformly spaced particles. To prevent this some dispersing agent, such as nitrocellulose, say of half-second viscosity, must be added to the binder. If too much is added, however, the coating will have "comb-marks" or straight longitudinal lines in it. The proper quantity becomes less in value and greater in criticalness as the particle size of the material is reduced. When the particle size is below 0.01 microns, the quantity of nitrocellulose needed becomes, vanishingly small. A small amount of methyl phthalate may be added as a plasticizer. In some cases a water solution of glue or gelatine may be used as the binder if the luminescent material is one not affected adversely by water.

When the particles of material, filter or luminescent, are suspended in the binding medium, the suspension is applied to the tube to be coated. One manner of doing this is by flushing the suspension into the tube to be coated by air pressure, and then allowing it to drain out. Another is to spray the suspension, on the inside of the top of the tube, and let it drain downward.

The tube is then dried. If some plasticizer such as methyl phthalate or the like has not been used in the binder, the tube cannot be dried uniformly without the coating peeling off. If quick drying is essential, and particularly if tubing of a diameter as small as 15 mm. is being coated, acetone may be used instead of amyl acetate.

When the coating is dry, the tube is heated in the presence of air or oxygen at a high temperature say 400° C. maximum. The coating will at first turn brown, due to carbonization of the binder, but will afterward lose the brown color as the heating is continued, since the carbon will be oxidized away. The heating should be continued until all, or practically all, of the carbon has burned away. The presence of more than one-half of one per cent (0.5%) carbon in the coating may result in the absorption of enough light to spoil it. On the other hand, the presence of an extremely small amount of carbon, say 0.01%, will make the coating sufficiently conductive to lower the starting voltage when used in a lamp, and will insure that the starting voltage be uniform for a given batch of lamps. The carbon may be left in the coating by not prolonging the heating until all is removed or may be mixed in with the luminescent or filter particles in the original suspension in the form of graphite, which will not oxidize at the baking temperatures.

The filter layer may first be produced on the glass by the above method, and then the process may be repeated to produce the luminescent layer on top of the filter layer. If desired, the filter layer may be baked only to brownness, to decompose the binder, and the luminescent coating then added, with the entire coating then being baked completely. In the event that the lamp is one in which the filter layer is not used, the luminescent coating may be used directly on the glass. In some cases a filter layer over the luminescent layer may be desirable. If the color or characteristics of the luminescent material would be changed by the wavelength or character of the exciting rays, a filter layer might be used to absorb the undesired rays before they reached the luminescent layer, and yet to pass the desired rays.

If a red light is to be emitted from the lamp, a pink-luminescing material, cadmium borate, for example, may be used with a filter layer of barium sulphate, cadmium selenide and cadmium sulphide, preferably in the proportions by weight, respectively of approximately 50%, 47% and 3%.

The sulphate and the cadmium salts used in the filter layer should be thoroughly mixed together, for example, by being placed in a ball-mill with amyl acetate for about twenty-four hours. In heating the filter coating, care should be taken to keep the oven temperature from rising too high. For example, while oven temperature as high as 700° C. may be used in baking some fluorescent coatings, a temperature above 400° C. should not be used for the filter layers described, which change color when heated to high temperatures.

If the luminescent coating over the filter coating is too thick, it will peel off, particularly where any mercury vapor used in the lamp condenses on it. If the coating is made thin, it will not peel off. The peeling is most pronounced in the gold lamp described, less in the red lamp, and still less in a lamp with no filter coating. If the luminescent layer is made thick enough to give the maximum efficiency of light production from the lamp, the coating will peel considerably during life. If however, a thickness about half that giving maximum efficiency is used, the coating will not peel. Although the thickness of such a coating is small, and the efficiency less, nonetheless the efficiency will not be more than 10% less, because the curve of efficiency against thickness is quite flat near the optimum.

What we claim is:

1. In an electric discharge lamp: a glass tube having on its interior surface a porous coating comprising an intimate mixture of fine particles of barium sulphate and cadmium sulphide: a porous coating comprising zinc manganese beryllium meta-silicate of slightly larger particle size over the filter coating; and a filling of inert gas and mercury vapor in said discharge tube.

2. The combination of claim 1, in which the thickness of the luminescent coating is about half the thickness corresponding to maximum efficiency.

3. In an electric discharge lamp: a glass tube having on its interior surface a colored filter coating comprising barium sulphate, and cadmium sulphide; and a coating of meta-silicate luminescent material over the filter coating, the particles of the filter coating being less than 1 micron in size, while those in the luminescent coating are less than 7 microns in size.

4. The combination of claim 1 in which the silicate is a meta-silicate.

5. In an electric discharge lamp: a glass tube having on its interior surface a colored filter coating; and a coating of luminescent material over the filter coating, the thickness of the luminescent coating being about half the thickness corresponding to maximum efficiency, of light production from the lamp.

6. The combination of claim 5 in which the particles of the filter coating are less than 1 micron in size, while those in the luminescent coating are less than 7 microns in size.

GEORGE E. HOLMAN.
EZIO THOMAS CASELLINI.